US009699028B2

(12) United States Patent
Feng et al.

(10) Patent No.: US 9,699,028 B2
(45) Date of Patent: Jul. 4, 2017

(54) METHOD AND DEVICE FOR UPDATING CLIENT

(71) Applicant: Alibaba Group Holding Limited, George Town (KY)

(72) Inventors: Zhaolin Feng, Hangzhou (CN); Zhongsheng Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 369 days.

(21) Appl. No.: 14/250,236

(22) Filed: Apr. 10, 2014

(65) Prior Publication Data
US 2014/0317174 A1 Oct. 23, 2014

(30) Foreign Application Priority Data

Apr. 22, 2013 (CN) .......................... 2013 1 0141479

(51) Int. Cl.
H04L 12/24 (2006.01)
H04L 29/06 (2006.01)
G06F 9/445 (2006.01)

(52) U.S. Cl.
CPC .............. H04L 41/082 (2013.01); G06F 8/65 (2013.01); H04L 67/42 (2013.01)

(58) Field of Classification Search
CPC .............................. H04L 41/082; H04L 67/42
USPC ....................................................... 709/203
See application file for complete search history.

(56) References Cited

U.S. PATENT DOCUMENTS

| 2005/0091651 A1* | 4/2005 | Curtis ....................... G06F 8/65 717/168 |
| 2006/0101450 A1* | 5/2006 | Datta ........................ G06F 8/65 717/168 |
| 2006/0168578 A1 | 7/2006 | Vorlicek |
| 2008/0227440 A1 | 9/2008 | Settepalli |
| 2009/0249321 A1 | 10/2009 | Mandyam |
| 2009/0328026 A1 | 12/2009 | Yamashita et al. |

(Continued)

FOREIGN PATENT DOCUMENTS

| CN | 102006449 | 4/2011 |
| JP | 2003271387 | 9/2003 |

(Continued)

OTHER PUBLICATIONS

Minglian Lu. "Research on Key Technology of Terminal Software Management and Its Dynamic Updating", published in Chinese Masters Dissertations of Excellence, full text database (information technology series) Issue 9, publication date Sep. 30, 2011.

Primary Examiner — Suraj Joshi
(74) Attorney, Agent, or Firm — Van Pelt, Yi & James LLP

(57) ABSTRACT

Embodiments of the present application relate to a method for updating a client, a device for updating a client, and a computer program product for updating a client. The method includes determining whether the client is to be updated, in the event that the client is to be updated, determining update packages for the client, determining a user's preferred functions from among functions offered by the client based on saved record of operations of the user corresponding to the client, determining update packages, from among the determined update packages, on which the user's preferred functions depend to serve as preferred packages, and releasing the preferred packages to the client to be updated.

11 Claims, 6 Drawing Sheets

(56) References Cited

U.S. PATENT DOCUMENTS

| | | |
|---|---|---|
| 2010/0107150 A1 | 4/2010 | Kamada et al. |
| 2011/0289499 A1 | 11/2011 | Haubold et al. |
| 2013/0124458 A1 | 5/2013 | Barreto et al. |
| 2013/0151594 A1* | 6/2013 | Fernandez-Ruiz ..... H04L 67/42 709/203 |
| 2014/0109077 A1* | 4/2014 | Ashar ....................... G06F 9/44 717/171 |

FOREIGN PATENT DOCUMENTS

| | | |
|---|---|---|
| JP | 2006178881 | 7/2006 |
| JP | 2010079546 | 4/2010 |
| JP | 2011107954 | 6/2011 |
| WO | 2009120597 | 10/2009 |

\* cited by examiner

METHOD AND DEVICE FOR UPDATING CLIENT

CROSS REFERENCE TO OTHER APPLICATIONS

This application claims priority to People's Republic of China Patent Application No. 201310141479.6 entitled A CLIENT UPDATE METHOD AND DEVICE, filed Apr. 22, 2013 which is incorporated herein by reference for all purposes.

FIELD OF THE INVENTION

This application involves a method and device for updating a client.

BACKGROUND OF THE INVENTION

Currently, with the continuous development of wireless networks and mobile devices, wireless client applications are becoming increasingly common, and these client applications typically need to be updated frequently.

FIG. 1 is a flow chart illustrating a conventional process for updating a client. The process 100 is performed by a server and includes:

In 110, the server receives an update check from a client. The update check is sent by the client to verify that the software loaded on the client is up to date.

Specifically, during startup of the client, the client transmits a version number of the client applications to the server to initiate the update check.

In 120, the server determines whether the client is to be updated. If the client is to be updated, control is passed to 130. If the client is not to be updated, control is passed to 140.

Upon receipt of the version number sent by the client, the server compares the received version number of the client applications with the latest version number of the client applications currently available. If the received version number matches the latest version number, the client does not need to be updated. If the received version number does not match the latest version number, the client is to be updated.

In 130, if the received version number does not match the latest version number, the server releases a client update package to update the client.

When the server determines that the received version number is different from latest client version number currently available based on the comparison of the received version number and the latest version number, the server determines all update packages for the client, and releases all update packages to update the client.

In 140, if the received version number matches the latest version number, the server notifies the client that it is not to be updated.

However, typically a client is able to offer many functions, with each function depending on a certain package or a certain plurality of packages. Because users have different usage habits, a user is typically likely only to use a certain function or a certain plurality of functions, but the user is not likely to use all offered functions. For example, a client offers credit card payment and utility bill payment functions, and the user ordinarily uses only the credit card payment function of the client, but very rarely or never uses the utility bill payment function of the client.

However, in the conventional process 100, once the server determines that the client is to be updated, regardless of whether a function supported by the client update package is used regularly, all update packages are inevitably released to update the client. This process clearly wastes network resources by updating packages that are not regularly used, decreases client update efficiency, and when conditions of a client network environment are relatively congested, substantially lengthens client update time.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, in order to update only a portion of the packages contained in the client based on a user preference, the server determines the user's preferred functions, i.e., functions routinely used by the user, based on a saved record of operations of the user, and releases the update packages on which the user's preferred functions depend to the client to be updated because only a portion of the packages contained in the client is updated. Updating only a portion of the packages effectively conserves network resources and increases the efficiency of client updates.

Figure 1:
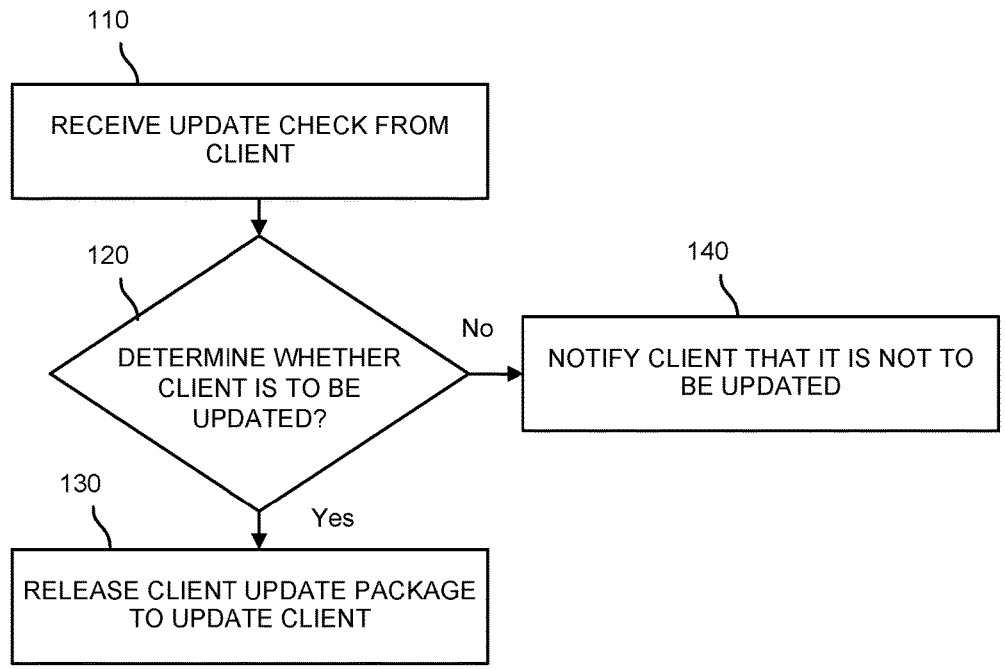
FIG. 1 is a flow chart illustrating a conventional process for updating a client.
Figure 2A:
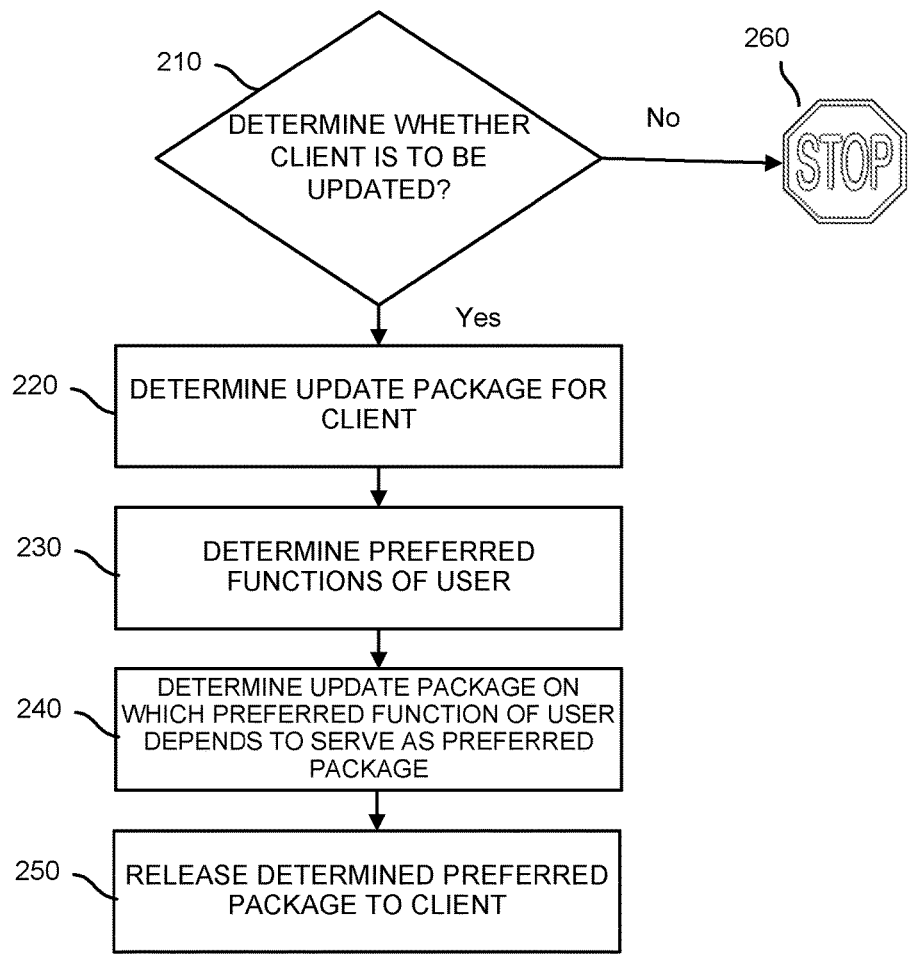
FIG. 2A is a flow chart illustrating an embodiment of a process for updating a client.

FIG. 2A is a flow chart illustrating an embodiment of a process for updating a client. In some embodiments, the process 200 is implemented by a server 520 of FIG. 5 and comprises:

In 210, the server determines whether a client is to be updated.

In 260, in the event that the server determines that the client is not to be updated, the process ends.

In 220, in the event that the server determines that the client is to be updated, the server determines update packages for the client. In some embodiments, an update package includes a function or a group of functions relating to an application. In some embodiments, the functions included in the update package relate to a portion of an application where additional functions not included in the update package are required to completely update the application.

In some embodiments, during startup, the client initiates an update check with the server by transmitting the client's own version number of client applications to the server. Typically, each client application has a certain version number. In certain scenarios, in order to update a client application, newer functions are to be downloaded to the client. Upon receiving the client's version number of the client applications, the server compares the client's version number of the client applications to the latest version number currently available of the client applications. In the event that the two version numbers are different, the server determines that the client is to be updated, or in the event that the two version numbers are the same, the server determines that the client is not to be updated.

In the event that the server determines that the client is to be updated, the server also determines update packages for the client based on the comparing of the two version numbers. As an example, the server uses a version tree comparison technique to determine which packages contained in the client are to be updated, and determines the latest packages in the server corresponding to the packages to be updated, i.e., the update packages for the client. For example, after determining a first package included in the client to be updated, the server determines that a latest package in the server corresponding to the first package is package 1', and then determines that the package 1' is an update package for the client. As an example, package 1' is viewed as a new version number for a set of functions. When a function has a new version available, then the function on the client is ready to be updated.

Figure 2B:
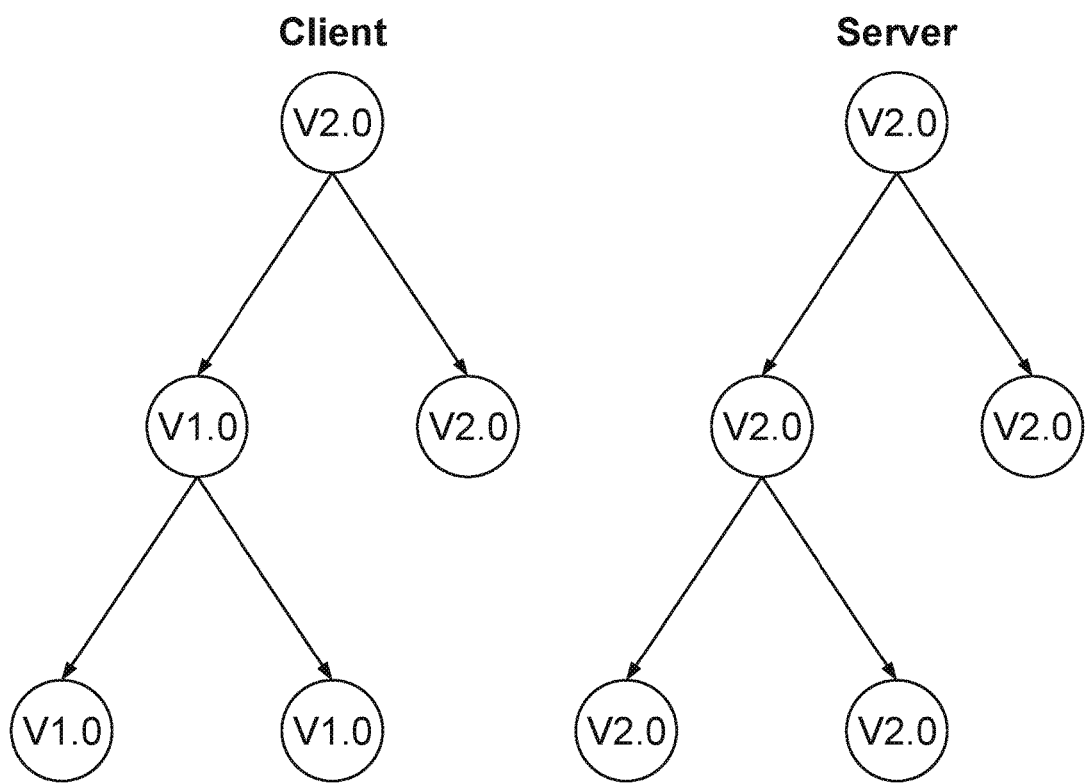
FIG. 2B is a diagram illustrating an embodiment of a version tree.

FIG. 2B is a diagram illustrating an embodiment of a version tree. In some embodiments, a version tree comparison technique is performed in the version tree, as shown in FIG. 2B. Using the version tree comparison technique, an application and each of its functions is organized into the version tree, where each function has its own version, and the parent node's version is newer than or the same as the child nodes' version, as shown FIG. 2B. When updating, search the version tree to find which function is to be updated. For example, as shown in FIG. 2B, on the client, a child node's function (V1.0) of the root node (V2.0) is to be updated. Also, the two child node's functions (V1.0) of the function to be updated are to be updated.

In 230, the server determines preferred functions of the user based on a stored record of operations of a user's client.

In some embodiments, the server is capable of determining the number of times the user has used each function offered by the client in sequence from the highest to the lowest number of times used within a designated time range based on the stored record of operations of the user. Based on the usage information, the server selects a designated number of functions to serve as the determined preferred functions of the user. Examples of the designated time range include the past year, the past month, or any other period of time.

In some embodiments, a user corresponding to a client refers to a user account number that has logged on via the client. In the event that the client initiates an update check with the server, the client simultaneously transmits the client's own version number as well as a user identifier corresponding to the user (such as a user screen name, a user identity (ID), etc.) to the server.

In some embodiments, the server saves in advance the correspondences of various types of operations to the various functions offered by the client, and determines the number of times the user has executed each type of operation within a designated time range based on the recorded operations of the user corresponding to the client. In some embodiments, the server creates an operation log for each user and saves each operation record of a user in the user's operation log, and also creates an operation record table for the user and saves each operation record of the user in the operation record table. In some embodiments, an operation record includes a user ID, a type of operation executed by the user, and a time that the operation occurred. Thus, the server is able to count the number of records including the same type of operation and for which times are within the designated time range in the user's operation log or operation record table to serve as the number of times the user has executed the type of operation within the designated time range.

In some embodiments, regarding the type of operation, because the number of times that the user executes the type of operation within a designated time range corresponds to the number of times the function in the client that corresponds to this type of operation is used, for each function, the server determines the number of times the user has executed the type of operation corresponding to the function within a designated time range to serve as the determined number of times the user has used the function within the designated time range.

For example, suppose that the client offers credit card payment and utility bill payment functions. For the credit card payment function offered by the client, operations corresponding to this function are preset as a credit card payment operation. Based on the various operation records saved in the operation log, the server determines the number of times the user has executed the credit card payment operation within the designated time range (e.g., the past year, the past month, or any other period of time) to serve as the number of times the user has used the credit card payment function. Similarly, the server can determine the number of times the user has used the utility bill payment and/or other functions within the designated time range.

Subsequently, suppose that a designated number of preferred functions is one, the number of times the user used the credit card payment function is determined to be 20, and the number of times the user used the utility bill payment function is determined to be two, in sequence from the highest to the lowest number of times used, the server selects one function having the highest number of times used, i.e., the credit card payment function, to serve as a preferred function of the user. In other words, the functions can be ordered based on the number of uses of the functions.

In 240, the server determines update packages, from among determined update packages, on which the preferred function of the user depends to serve as preferred packages.

After the server has determined the preferred functions of the user corresponding to the client, the server then determines, from among the determined update packages, the update packages on which the preferred functions of the user depend based on dependency relationships between the various functions of the client and the various packages saved in advance, and uses the update packages on which the preferred functions of the user depend as the preferred packages. As an example, when the server determines that the most used function is the credit card payment function, the next most used function is the utility bill payment function, and the rest of the functions are not frequently used, the server determines that only the credit card payment function and the utility bill payment function are to be updated. In this example, the update packages that include these two functions are the preferred packages for the user.

In 250, the server releases the determined preferred packages to the client to update corresponding packages of the client.

In some embodiments, after determining the preferred packages, the server releases the preferred packages to the client, so that the client can update its own package.

Using the process above, the server is able to release only update packages on which the preferred functions of the user depend, and does not need to release all update packages to the client. Thus, network resources can be conserved. In addition, because the client also only updates a portion of the packages instead of updating all of its packages, efficiency of client updates is also increased.

In practical application scenarios, network environments of various clients differ, and for clients operating in relatively poor network environments, if the number of packages being updated is very large, client update time can be substantially long and client update efficiency can be reduced. In some embodiments, before determining the preferred functions of the user corresponding to the client, the server receives network environment information submitted by the client. Subsequently, when the server successively selects the designated number of functions in sequence from the highest to the lowest number of times used to serve as the preferred functions of the user, the server can determine the designated number based on the network environment information submitted by the client and a preset mapping of network environment information to designated numbers, and in sequence from the highest to the lowest number of times the user has used each function, successively selecting the determined designated number of functions to serve as the determined preferred functions of the user. In some embodiments, the poorer the network environment is, the less the corresponding designated number of functions serve as the determined preferred functions of the user.

For example, the network environment information includes 2nd generation mobile communication technology (2G) networks, 3rd generation mobile communication technology (3G) networks, and wireless fidelity (Wi-Fi) networks, and the preset mapping of network environment information to designated numbers is as follows: the designated number corresponding to 2G networks is three, the designated number corresponding to 3G networks is six, and the designated number corresponding to Wi-Fi networks is the number of all packages contained in the client. In the event that the network environment information submitted by the client is a 2G network, the server determines that the designated number corresponding to the 2G networks is three. Therefore, in sequence from the highest to the lowest number of times each function has been used by the user, the server successively selects three functions to serve as the preferred functions of the user. However, in the event that the network environment information submitted by the client is a Wi-Fi network, the server uses all of the functions of the client as the preferred functions of the user. On the Wi-Fi network, the server releases all of the update packages to the client to perform the update of the client.

In some embodiments, in the event that the network environment information submitted by the client satisfies a designated condition, the server also releases to the client all of the update packages not yet released to the client to be updated. Continuing with the above example, after the client initiates an update check at a certain time, the server determines that a total of ten update packages for this client exist, and the network environment information submitted by the client corresponds with a 2G network. Therefore, the server only releases three update packages to the client, and at a subsequent time, after the client again initiates an update check and the submitted network environment information corresponds to a Wi-Fi network, which satisfies the designated condition, whereupon the server releases all of the remaining seven update packages to the client to perform the update. In other words, designated conditions relate to different networking environments, which have different speeds, different tariffs, etc. Examples of different networking environments include: 1) the speed of the 2G environment is slow relative to the other networks and the tariff of a 2G environment is high relative to tariffs of other networks, 2) the speed of a 3G environment is fast relative to other networks and the tariff of the 3G environment is high relative to the other networks, and 3) the speed of a Wi-Fi environment is fast relative to other networks and the tariff of the Wi-Fi environment is usually free or much lower relative to other networks. In some embodiments, the packages to be updated are determined based on the designated condition.

The above example only employs 2G networks, 3G networks and Wi-Fi networks to illustrate mappings between the network environment information and designated numbers. In some embodiments, the network environment information also includes other network quality indicators, such as download speed, and mappings between network environment information and designated numbers are preset using a continuous function or a discrete function, as long as the designated number of preferred functions of the user to be selected is determined based on the network environment information. In some embodiments, the continuous function is determined based on actual conditions. For example, if the current network speed is x k/s, the coefficient K in a 2G environment is one, the coefficient K in a 3G environment is three, the coefficient K in a Wi-Fi environment is 20, and a ceiling function takes a whole number, then the designated number of preferred functions y is K*CEILING (x/100). In some embodiments, the discrete function is determined based on actual conditions. An example of the discrete function is as follows: the designated number of preferred functions y is one (2G environment), two (3G environment), three (4G environment), and 20 (Wi-Fi environment).

In 250, after the server determines the preferred packages using the process above, the server directly releases the determined preferred packages to the client to be updated.

However, in the event that the reception of the preferred packages released by the server is interrupted due to network reasons (such as sudden network disconnection), the server does not know the break point for resumption of transmission of the preferred packages. Accordingly, the initiation of the above update check is repeated, and the efficiency of client updates is severely reduced.

Figure 3:
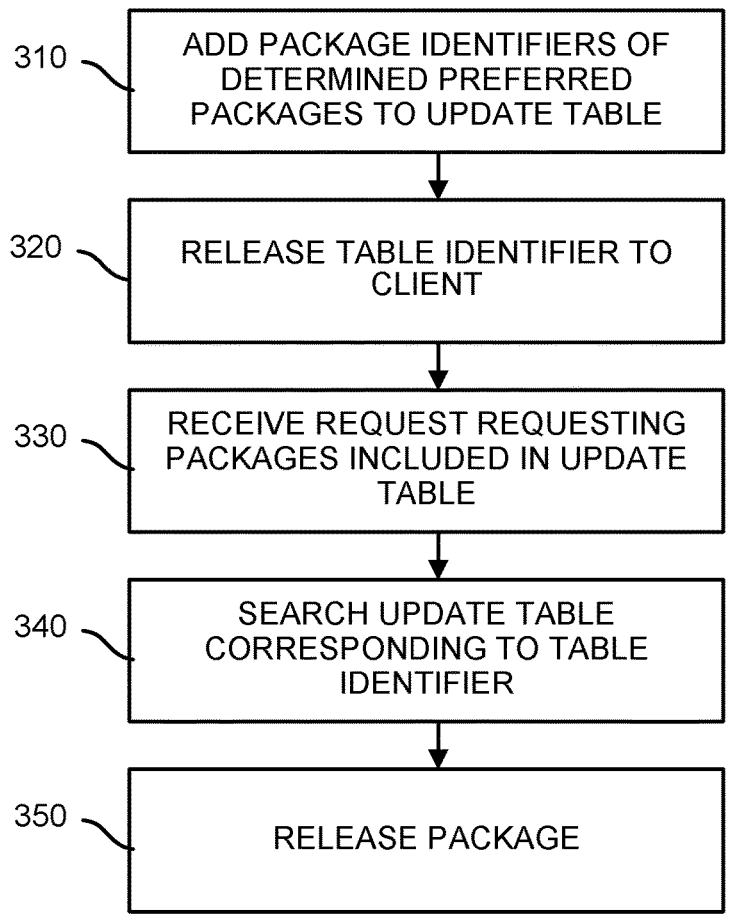
FIG. 3 is a flow chart illustrating an embodiment of a process for releasing a preferred package to a client.

FIG. 3 is a flow chart illustrating an embodiment of a process for releasing a preferred package to a client. In some embodiments, the process 300 is an implementation of 250 and comprises:

In 310, the server adds package identifiers of the determined preferred packages to an update table and assigns a unique table identifier to the update table.

In 320, the server releases the table identifier to the client.

In some embodiments, after the server determines the preferred packages, the server then adds the package identifiers (e.g., package names, packet numbers, etc.) of all of the determined preferred packages to the update table and assigns a unique table identifier (e.g., a table ID) to the update table. Subsequently, the server releases the table identifier to the client. The update table corresponds to the client's update plan, which records the update packages to be used by the client in the current update (i.e., the preferred packages). The server releases (sends) preferred packages according to the update table. Each time the server releases a preferred package corresponding to the package identifier recorded in the update table to the client and the client acknowledges successful receipt of the package, the server adds a released tag to the corresponding package identifier of the preferred package included in the update table to indicate that the package has been successfully sent and acknowledged.

In 330, the server receives a request requesting the packages included in the update table corresponding to the table identifier transmitted by the client. The request includes the table identifier.

After the client receives the table identifier transmitted by the server, the client saves the table identifier, and transmits the request including this table identifier to the server to request the packages included in the update table corresponding to the table identifier from the server.

In 340, the server searches the update table corresponding to the table identifier.

In 350, the server releases the packages corresponding to the package identifiers included in the update table, to which the released tag has not been added, to the client to be updated.

Using the above process 300 of FIG. 3, because the server has already added the package identifiers of the various preferred packages to the update table corresponding to the unique table identifier, even if the reception of the preferred packages is interrupted by the client, the entire process 200 of FIG. 2A does not need to be repeated. The client resends only the table identifier to the server to request the packages in the update table corresponding to the table identifier. In addition, the server adds a released tag to the package identifiers corresponding to the packages already successfully released. Thus, when the reception of the preferred packages is interrupted by the client, the server only searches for and releases the packages corresponding to package identifiers to which the released tag has not been added, and does not repeat releasing the packages corresponding to all of the package identifiers contained in the update table, to further increase client update efficiency.

In some embodiments, in order to ensure that the client is able to operate normally after an update, the server also determines, from among the determined update packages, update packages on which the various preferred packages depend to serve as dependent packages and releases the dependent packages to the client to be updated.

For example, suppose that the preferred packages determined by the server are the credit card payment package and the utility bill payment package, and these two packages both depend on a password input security package. In addition to the credit card payment package and the utility bill payment package, the determined update packages also include the password input security package. As an example, if function A depends on function B, function C also depends on function B, and functions A and B are to be updated, function C also is to be updated; otherwise, the software of the client cannot operate normally. In some embodiments, the dependency relationship is preconfigured on the server. Thus, in the event that only the credit card payment and utility bill payment packages are released to the client to be updated, and the password input security package is not released to the client to be updated, the client's functions may be unable to operate normally (or unable to provide the credit card payment and utility bill payment functions normally) after the update. Therefore, the server also determines, from among the determined update packages, the update packages on which the credit card payment package and the utility bill payment package depend (i.e., the password input security package), and releases the password input security package as a dependent package to the client to be updated to ensure that the client is able to operate normally after the update.

Of course, after the server determines the dependent package, the dependent package can also depend on other determined update packages (e.g., the password input security package in the example above also depends on other update packages), the server continues to determine the other update packages on which the dependent package depends, uses these other update packages as dependent packages, and continues to employ the same technique recursively to determine all dependent packages and releases the dependent packages.

Furthermore, in some embodiments, the update packages for the client include certain major vulnerability repair update packages. These vulnerability repair update packages relate to the normal operation of the client, thus importance weightings are assigned to each update package of the client in advance. The major vulnerability repair update packages are assigned higher importance weightings, while certain optimization or update packages are assigned lower importance weightings. Thus, from among the determined update packages, the server also determines the update packages having importance weightings greater than a predefined threshold value that serve as mandatory update packages. In other words, the server uses update packages having importance weightings greater than a predefined threshold value as mandatory update packages, and releases the mandatory update packages to the client to be updated. As an example, a predefined threshold value is five, a specified weighting assigned to a major vulnerability repair update package is ten (or a value greater than five), and a specified weighting assigned to a minor optimization or update package is one (or a value less than five). Whenever the predefined threshold value is exceeded, the major vulnerability repair update package is to be updated; otherwise, the major vulnerability repair update package is not to be updated. In some embodiments, necessary fixes to functions will always be updated.

Correspondingly, regarding the release of dependent packages and mandatory update packages, the server also releases the dependent packages and the mandatory update packages using the update table technique, i.e., the server adds the package identifiers of the preferred packages, the dependent packages, and the mandatory update packages to the update table, assigns the unique table identifier to this update table, and releases the table identifier to the client. In some embodiments, a released tag is added to the package identifiers corresponding to the packages in the update table that have already been released to the client. Upon receipt of the table identifier transmitted by the client, the packages corresponding to the package identifiers to which the released tag has not been added in the update table are released to the client to be updated.

Additionally, in some embodiments, after determining the update packages for the client, the server also determines preference weightings for the update packages on which each function depends based on the number of times the user corresponding to the client has used each function. The greater the number of times a function is used, the higher the preference weighting of the update package on which the function depends. Subsequently, for each update package, a total weight of the preference weighting and the importance weighting of the update package is determined. Next, the server determines the designated number corresponding to the network environment information submitted by the client and the preset correspondences of network environment information to the designated numbers. Subsequently, in sequence from the greatest to the least total weights of the various update packages, the server successively selects the determined designated number of update packages for inclusion to update packages to be released, whereupon the update packages on which each package to be released depends are determined recursively from among the update packages for the client. The dependent packages are also included as update packages to be released, and the various update packages to be released are released to the client to be updated.

The processes 200 and 300 described above are client update processes. Based on the above processes 200 and 300, a device for updating a client is depicted in FIG. 4.

Figure 4:
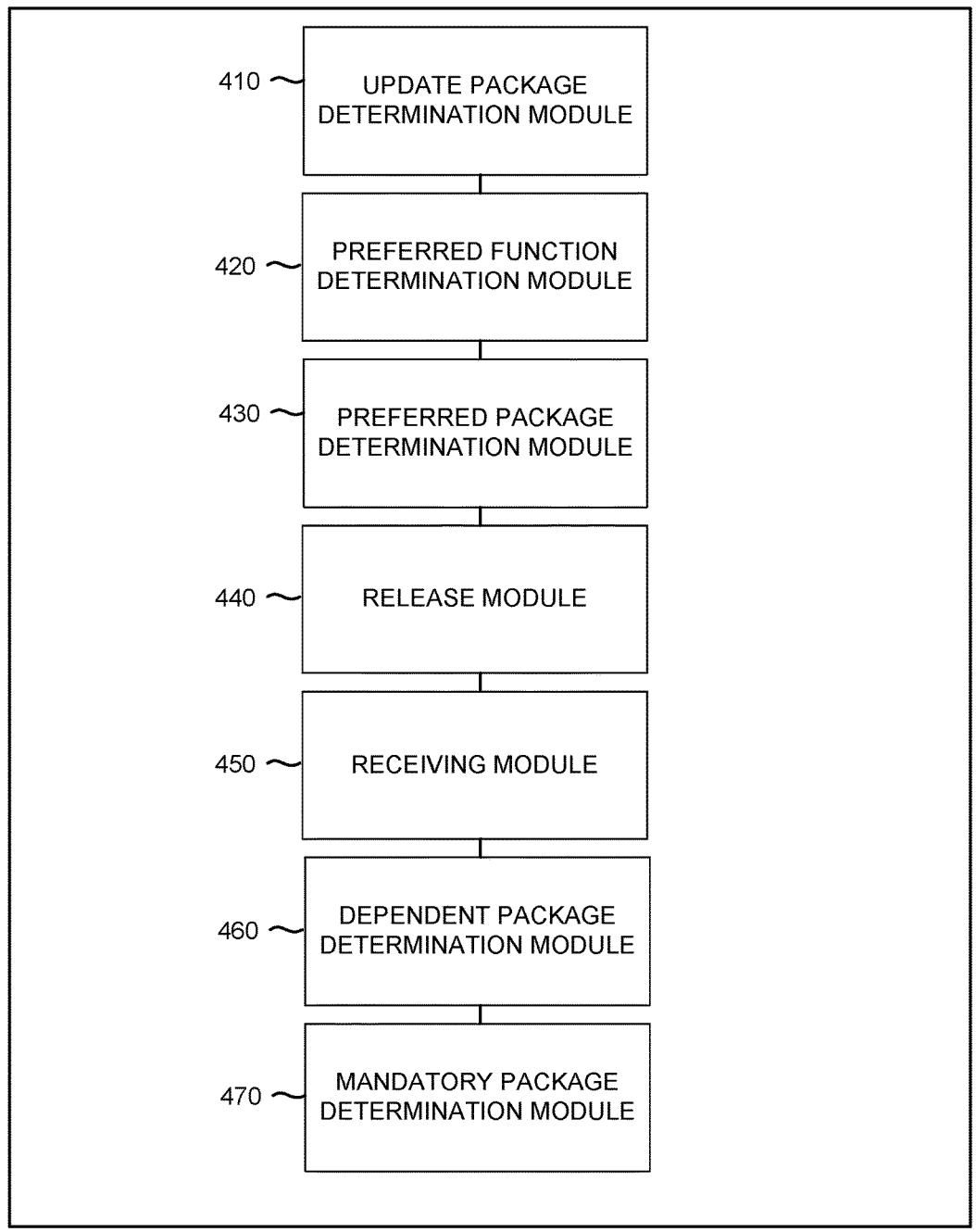
FIG. 4 is a diagram illustrating an embodiment of a device for updating a client.

FIG. 4 is a diagram illustrating an embodiment of a device for updating a client. In some embodiments, the device 400 implements processes 200 and 300 and comprises an update package determination module 410, a preferred function determination module 420, a preferred package determination module 430, and a release module 440.

The update package determination module 410 determines update packages for a client when a determination is made that the client is to be updated.

The preferred function determination module 420 determines preferred functions of a user from among functions offered by the client based on a saved record of operations of the user corresponding to the client.

The preferred package determination module 430 determines, from among the determined update packages, update packages on which the preferred functions of the user depend to serve as preferred packages.

The release module 440 releases the determined preferred packages to the client to be updated.

The preferred function determination module 420 determines a number of times the user has used each function offered by the client within a designated time range based on the saved record of operations of the user corresponding to the client, and successively selects, in sequence from the highest to the lowest number of times used, a designated number of functions to serve as the determined preferred functions for the user.

In some embodiment, the device 400 further comprises a receiving module 450.

Before the preferred function determination module 420 determines the preferred functions of the user, the receiving module 450 receives network environment information submitted by the client.

The preferred function determination module 420 determines the designated number corresponding to the network information submitted by the client based on the network environment information submitted by the client received by the receiving module 450 and a preset mapping of network environment information to designated numbers, and in sequence from the highest to the lowest number of times used, successively selects the determined designated number of functions to serve as the determined preferred functions of the user.

The release module 440 adds package identifiers of the determined preferred packages to an update table, assigns a unique table identifier to the update table, and releases the table identifier to the client. In some embodiments, a released tag is added to the package identifiers of the preferred packages already released to the client. Upon receipt of the table identifier transmitted by the client, the update table corresponding to the table identifier transmitted by the client is searched, and the packages found in the update table corresponding to the package identifiers to which the released tag has not been added are released to the client to be updated.

In some embodiments, the device further comprises a dependent package determination module 460, and a mandatory package determination module 470.

The dependent package determination module 460 determines, from among the update packages, the update packages on which the preferred packages depend to serve as dependent packages for the client.

The mandatory package determination module 470 determines, from among the update packages, update packages having an importance weighting greater than a predetermined threshold value, to serve as mandatory update packages for the client.

The release module 440 releases the determined dependent packages and the mandatory update packages to the client to be updated.

In some embodiments, the above device for updating the client is located on the server.

Figure 5:
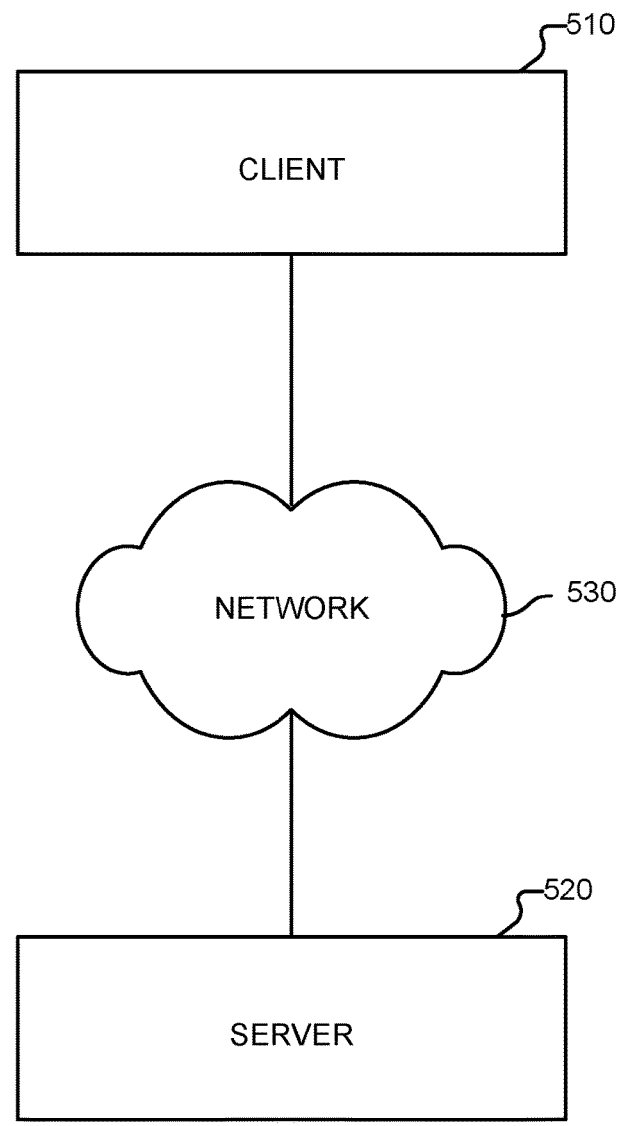
FIG. 5 is a diagram illustrating an embodiment of a system for updating a client.

FIG. 5 is a diagram illustrating an embodiment of a system for updating a client. In some embodiments, the system 500 includes a server 520 connected to a client 510 via a network 530.

In some embodiments, the client 510 sends an update check to the server 520 via the network 530. Upon receiving the update check, the server 520 determines whether the client 510 is to be updated. In the event that the server 520 determines that the client 510 is to be updated, the server 520 sends an update package including preferred packages to the client 510 based on a user's preferred functions.

A process and device for updating a client are provided. The process includes when a determination is made that a client is to be updated, the server determines update packages for the client, determines packages on which preferred functions of the user depend from among the determined update packages for the client, and releases the packages on which the preferred functions of the user depend to the client to be updated. Accordingly, the server is not required to release all update packages to update the client. Instead, only the packages on which the preferred functions of the user depend are to be updated. Thus, network resources are conserved and the efficiency of updating the client is increased.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for updating a client, comprising:
   determining whether the client is to be updated;
   in the event that the client is to be updated, determining update packages for the client, comprising:
      determining which packages to update based on a version tree comparison, comprising:
         determining whether a version of a parent node is newer than a version of a child node, wherein an application and functions related to the application are arranged into a tree, each function having a version; and
         in the event that the version of the parent node is newer than the version of the child node, updating a function corresponding to the child node;
   determining a user's preferred functions from among functions offered by the client based on saved record of operations of the user corresponding to the client, comprising:
      determining a number of times the user has used each function offered by the client within a designated time range based on a saved record of operations of the user corresponding to the client; and
      successively selecting a designated number of functions, in sequence from the highest to the lowest number of times used, to serve as the preferred functions of the user, comprising:
         determining the designated number based on network environment information from the client and a preset mapping of network environment information to designated numbers;
   determining selective update packages, from among the determined update packages, on which the user's preferred functions depend to serve as preferred packages, comprising:
      determining whether an update package of the update packages is required for a preferred function of the preferred functions to operate normally; and
      in the event that the update package is required for the preferred function to operate normally, adding the update package to the preferred packages; and
   releasing the preferred packages to the client to be updated.

2. The method as described in claim 1, wherein the releasing of the determined preferred packages to the client to be updated comprises:
   adding package identifiers of the determined preferred packages to an update table;
   assigning a unique table identifier to the update table;
   releasing the table identifier to the client;
   adding a released tag to the package identifiers of the preferred packages in the update table which have already been released to the client;
   determining whether a table identifier transmitted by the client has been received; and
   in the event that the table identifier transmitted by the client has been received:
      searching the update table corresponding to the table identifier transmitted by the client; and
      releasing packages corresponding to package identifiers to which the released identifier has not been added to the client to be updated.

3. The method as described in claim 1, wherein the determining of the selective update packages, from among the determined update packages for the client, on which the preferred packages depend, to serve as dependent packages comprises:
   determining update packages, from among the determined update packages for the client, having importance weights greater than a predetermined threshold value to serve as mandatory update packages; and
   releasing the dependent packages and the mandatory update packages to the client to be updated.

4. The method as described in claim 1, wherein the update package packages is required for a plurality of preferred functions to operate normally.

5. The method as described in claim 1, wherein in the event that the version of the parent node is the same as the version of the child node, omitting updating the function corresponding to the child node.

6. A system for updating a client, comprising:
   at least one processor configured to:
      determine whether the client is to be updated;
      in the event that the client is to be updated, determine update packages for the client, comprising to:
         determine which packages to update based on a version tree comparison, comprising to:
            determine whether a version of a parent node is newer than a version of a child node, wherein an application and functions related to the application are arranged into a tree, each function having a version; and
            in the event that the version of the parent node is newer than the version of the child node, update a function corresponding to the child node;

determine a user's preferred functions from among functions offered by the client based on saved record of operations of the user corresponding to the client, comprising to:
  determine a number of times the user has used each function offered by the client within a designated time range based on a saved record of operations of the user corresponding to the client; and
  successively select a designated number of functions, in sequence from the highest to the lowest number of times used, to serve as the preferred functions of the user, comprising to:
    determine the designated number based on network environment information from the client and a preset mapping of network environment information to designated numbers;
  determine selective update packages, from among the determined update packages, on which the user's preferred functions depend to serve as preferred packages, comprising to:
    determine whether an update package of the update packages is required for a preferred function of the preferred functions to operate normally; and
    in the event that the update package is required for the preferred function to operate normally, add the update package to the preferred packages; and
  release the preferred packages to the client to be updated; and
a memory coupled to the at least one processor and configured to provide the at least one processor with instructions.

7. The system as described in claim 6, wherein the releasing of the determined preferred packages to the client to be updated comprises:
  add package identifiers of the determined preferred packages to an update table;
  assign a unique table identifier to the update table;
  release the table identifier to the client;
  add a released tag to the package identifiers of the preferred packages in the update table which have already been released to the client;
  determine whether a table identifier transmitted by the client has been received; and
  in the event that the table identifier transmitted by the client has been received:
    search the update table corresponding to the table identifier transmitted by the client; and
    release packages corresponding to package identifiers to which the released identifier has not been added to the client to be updated.

8. The system as described in claim 6, wherein the determining of the selective update packages, from among the determined update packages for the client, on which the preferred packages depend, to serve as dependent packages comprises to:
  determine update packages, from among the determined update packages for the client, having importance weights greater than a predetermined threshold value to serve as mandatory update packages; and
  release the dependent packages and the mandatory update packages to the client to be updated.

9. A computer program product for updating a client, the computer program product being embodied in a tangible non-transitory computer readable storage medium and comprising computer instructions for: determining whether the client is to be updated;
in the event that the client is to be updated, determining update packages for the client, comprising:
  determining which packages to update based on a version tree comparison, comprising:
    determining whether a version of a parent node is newer than a version of a child node, wherein an application and functions related to the application are arranged into a tree, each function having a version; and
    in the event that the version of the parent node is newer than the version of the child node, updating a function corresponding to the child node;
  determining a user's preferred functions from among functions offered by the client based on saved record of operations of the user corresponding to the client, comprising:
    determining a number of times the user has used each function offered by the client within a designated time range based on a saved record of operations of the user corresponding to the client; and
    successively selecting a designated number of functions, in sequence from the highest to the lowest number of times used, to serve as the preferred functions of the user, comprising:
      determining the designated number based on network environment information from the client and a preset mapping of network environment information to designated numbers;
  determining selective update packages, from among the determined update packages, on which the user's preferred functions depend to serve as preferred packages, comprising:
    determining whether an update package of the update packages is required for a preferred function of the preferred functions to operate normally; and
    in the event that the update package is required for the preferred function to operate normally, adding the update package to the preferred packages; and
  releasing the preferred packages to the client to be updated.

10. The computer program product as described in claim 9, wherein the releasing of the determined preferred packages to the client to be updated comprises:
  adding package identifiers of the determined preferred packages to an update table;
  assigning a unique table identifier to the update table;
  releasing the table identifier to the client;
  adding a released tag to the package identifiers of the preferred packages in the update table which have already been released to the client;
  determining whether a table identifier transmitted by the client has been received; and
  in the event that the table identifier transmitted by the client has been received:
    searching the update table corresponding to the table identifier transmitted by the client; and
    releasing packages corresponding to package identifiers to which the released identifier has not been added to the client to be updated.

11. The computer program product as described in claim 9, wherein the determining of the selective update packages, from among the determined update packages for the client, on which the preferred packages depend, to serve as dependent packages comprises:
  determining update packages, from among the determined update packages for the client, having importance weights greater than a predetermined threshold value to serve as mandatory update packages; and releasing the dependent packages and the mandatory update packages to the client to be updated.

* * * * *